June 14, 1960   R. H. GIESER, JR., ET AL   2,941,064
METHOD OF WELDING SHEET STEEL MEMBERS HAVING LINER SHEETS
Filed July 20, 1956

INVENTOR
RALPH H. GIESER, JR. &
JOHN R. THOMSON
BY
Gardner & Zimmerman
ATTORNEYS

United States Patent Office 2,941,064
Patented June 14, 1960

2,941,064
METHOD OF WELDING SHEET STEEL MEMBERS HAVING LINER SHEETS

Ralph H. Gieser, Jr., and John R. Thomson, Park Forest, Ill., assignors to Rheem Manufacturing Company, Richmond, Calif., a corporation of California Filed July 20, 1956, Ser. No. 599,199

4 Claims. (Cl. 219—92)

This invention generally relates to the art of manufacturing steel water heater tanks, boilers, etc. provided with an internal lining of relatively non-corrosive material.

Over a long period of time, many attempts have been made to produce a water heater tank formed of sheet steel and provided on its inner side with either an integral coating of non-corrosive material or a completely separate lining formed of such material. The difficulty entailed is in providing a proper seal between the liners or the coating at the joint between the body and end walls of the tank. With the advent of modern welding methods, it has been found commercially expedient to join the body and heads by welding and provide an efficient sealed joint between the non-corrosive portions of the heads and body respectively where the non-corrosive medium was in the form of an extremely thin coating integrally united with the steel backing. Especially has this been found effective where the non-corrosive coating has a relatively low melting point relative to that of the steel. In this connection, reference may be had to Patent No. 2,444,833, where the non-corrosive material consists of a deposit of zinc on the inner surfaces of the head and body members.

In the case, however, where the non-corrosive material is in the form of a thick deposit or a separate liner and of a nature which will not readily weld to steel, the above mentioned welding process has been found inadequate from a commercial standpoint. This is particularly true where the non-corrosive material has a relatively high melting point. By way of example, it has been found impractical to provide for an effective seal between the inner liner portions of a steel tank with the utilization of known welding methods when such liner portions are formed of aluminum sheeting. Thus, when resistance welding is employed in the manner illustrated in said patent for the purpose of joining the two steel members and of sealing together the two liner portion which are in between the steel members, it has been found that while the steel weld may be efficient, the seal between the liner members is either weak or wholly ineffective. This results from the fact that the comparatively high welding pressure required to unite the steel members is such as to expel the molten aluminum particles from an adjacent the steel weld area so that they are chilled in their new environment and as a result little or no fusion of the two liner sections takes place, the amount of heat conducted from the steel weld being insufficient to effect the fusion of the liners.

We have found that by confining the welding pressure to a smaller area than that traversed by the electric current, the steel members will become effectively welded in the pressurized area, and at the same time the liner portions traversed by the current but outside the pressurized area, will be heated to the melting point and left comparatively undisturbed so that a thorough fusion and bonding of the aluminum liners at this point will be produced. It will thus be evident that a steel to steel weld is provided for the steel sheets, and an aluminum to aluminum bond is produced for the liners.

Accordingly it is an object of our invention to provide a method and means of welding interlined steel tanks which will insure an efficient welding together of the steel members as well as a permanent seal and attachment between the liner sections.

Another object of the invention is to provide for the sealing and bonding of the liner parts independent of the steel backing parts so that the liner sections will form a separate sealed tank within the steel tank.

A further object of this invention is to provide a method of the character described which is applicable to a wide variety of designs and constructions of lined tanks.

The invention possesses other objects and features of advantage, some of which, with the foregoing, will be set forth in the following description of the preferred method of the invention, the description being supplemented by the drawing accompanying and forming part of the specification. It is to be understood, however, that variations in the showing made by the said drawing and description may be adopted within the scope of the invention as set forth in the claims.

Referring to said drawing.

Figure 1:
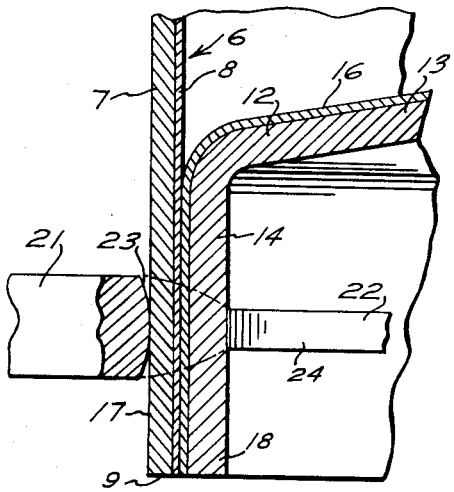
Figures 1 and 2 are fragmentary longitudinal sectional views of the body and end wall of a water heater tank before and after the welding operation.

The invention is illustrated in connection with the formation of a joint between the body and end wall of a water heater tank in which the backing is of sheet steel and is provided with a sheet of non-corrosive material such as aluminum which is designed to provide a protective liner for the interior of the tank. As shown in the drawing, the tank includes a generally cylindrical body 6 having a steel backing or outer shell 7 and an inner lining 8 of aluminum. The portion of the body illustrated is that adjacent the lower end 9 thereof, and this end is arranged to be closed by means of a bottom end wall 12 having a dished central portion 13 and a peripheral skirt or flange 14. The end wall is also formed of steel and is provided on the inner side thereof with a lining 16 of sheet aluminum or similar material fusible with the material of which the lining of the body is comprised. As will be clear from Figure 1, the outside diameter of the portion of the liner of the flange 14 substantially corresponds with the inner diameter of the body liner 8 so that when the end wall is inserted in operative position within the end of the body, the opposing surfaces of the respective liners will be in engagement.

As above set forth it is desired to join the body and end wall together in such manner that a sealed joint will be provided between the steel members and an independent sealed joint will be provided between the separate liner portions. With this arrangement a complete internal receptacle for the water in the tank is provided by the liners, and it is therefore most important that the seal between the liner portions be effective at all points of jointure of the sections and that the seal be maintained practically regardless and independent of the effectiveness and stability of the seal or joint between the steel members which simply provides the backing for the liners.

As the outer sides 17 and 18 of both of the steel parts of the body and flanges are exposed and accessible for contact by welding wheels, the joining of such steel parts may be readily effected by electric resistance seam welding. Thus as shown in Figure 1 of the drawings a set of welding wheels 21 and 22 of a seam welding apparatus (not shown) is arranged to be applied to the end of the tank so that the steel members with the two liners sandwiched therebetween will be engaged by the wheels 21 and 22 on the sides 17 and 18 respectively. As will be understood, with this type of welding operation, the wheels are caused to revolve about the periphery of the tank and in the course thereof rotated upon their own axes. While so engaged a current is impressed across the wheels and so traverses the metal members between the wheels so as to create the necessary welding temperature therein. At the same time the wheels are pressed inward against the sides 17 and 18 with sufficient force to deflect the contacted portions inwardly and thereby create a pressurized area in such deflected portions and the portions of any material in the space therebetween. The heated particles of the different members in the pressurized area are thus forced into intermingling relation and the welding of the members thereby effected.

The welding temperature for the steel members is in the order of 2000 degrees Fahrenheit, which is considerably above the melting point of the aluminum. We have found that as a result of the foregoing the molten aluminum particles in the pressurized area are literally blasted out of the area and that the resultant weld in the area is substantially exclusively steel with steel. This makes for a very effective jointure and seal for the backing members, but not so for the liners. This is apparently due to the fact that in the conventional resistance seam welder the peripheries of the cooperating wheels are transversely aligned and of the same thickness so that the flow of electric current through the gap between the wheels is confined to the portion of the work within the bounds of the pressurized area, that is, the area directly between the surface portions of the sides 17 and 18 with which the periphery of the wheels contact. In view of this the only heat imparted to the adjacent area of the work is merely by internal conduction of heat from the pressurized area. While this heat can be sufficient for fusing a thin film of low melting-point material such as zinc, it is entirely too low to assure fusion of a sheet of liner material of aluminum or the like having as in the present instance a thickness many times that of a mere film. Thus the expelling of the aluminum particles from the pressurized area into the relatively cool aluminum outside the pressurized area does not provide a positive seal between the liners.

We have found that if heat sufficient to fuse the aluminum is applied to the interengaged liner portions in the area outside the pressurized area during the time the aluminum particles are being expelled from the pressurized area into the non-pressurized area, a thorough fusion and seal between said liner portions will be provided while the steel to steel weld is being effected. The heat to bring the aluminum in the outside area to the melting point may be applied in any suitable manner. We prefer to supply such heat by electric current, and preferably by use of the same source of current as supplied for effecting the resistance weld through the welding wheels.

In general this is accomplished by providing at least one of the welding wheels with a peripheral portion which in the course of the welding operation, will be disposed opposite to but kept at minimum pressure contact with the portion of the work containing the liner portions adjoining but outside the high pressurized area at which the steel weld is made. In this manner, the current passing from one wheel to the other will not only traverse the high pressurized area of the work, but as well through the adjoining low pressurized area so as to provide for the heating of the aluminum in such latter area to the desired melting temperature without the attendant blasting and removal of the aluminum particles as occurs in a high pressurized area.

Figure 2:
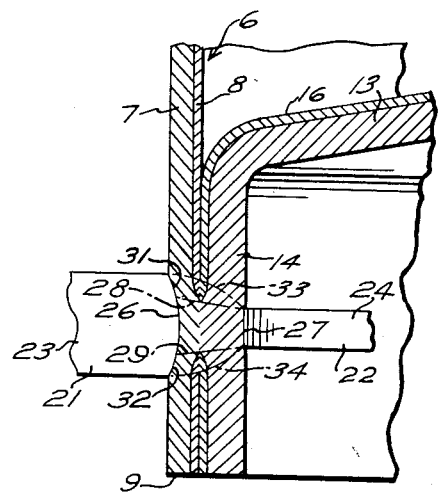

As will be seen from the drawings, for example, Figures 1 and 2, wheel 21 is of the type having a peripheral face 23 of convex cross-section, while the peripheral face 24 of wheel 22 is simply cylindrical. Also, while wheels 21 and 22 are aligned transversely, the thickness of wheel 21 at the periphery is much greater than that of wheel 22. Thus as the wheels are rotated and forced inward from the position shown in Figure 1 to the position indicated in Figure 2, sides 17 and 18 of the steel backing members will have formed therein depressions or grooves 26 and 27 respectively, and the portions of the backing members and liners between the two grooves will have been compressed. However, the degree of compression is not uniform due to the different thicknesses of the wheels 21 and 22. In other words, a high pressurized area and maximum compression occurs where the wheel peripheries are substantially in direct opposed relationship, while a very low pressurized area and minimum compression occurs where the outer edge portions 31 and 32 of the periphery of wheel 21 are not directly opposed to any portions of the periphery of wheel 22. This high pressurized area and zone of maximum compression is indicated as between the lines 28 and 29 in Figure 2. In this manner, when current is passed from one wheel to the other, a part of the current will flow through the high pressurized area of the work and part will flow through the low pressurized area of the work adjacent thereto. The outer boundaries of the current flow and consequently the heating zone are represented by the lines 33 and 34, and accordingly, low pressurized areas are shown as between the lines 28 and 33 and between lines 29 and 34. It will thus be clear that heat will be effectively applied to the liner portions adjacent the high pressurized area, and that such force or pressure as may be communicated to the low pressurized area will aid in effectively fusing the liner portions therein but is insufficient to blast any molten liner material from such area. It will also be evident that the portions 31 and 32 may be enlarged so that a greater area may be heated by the current and a greater area of seal between the liners provided.

Figure 3:
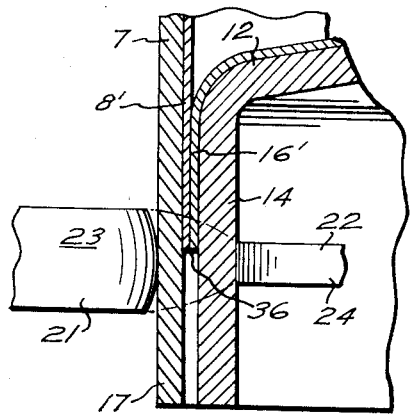
Figures 3 and 4 are views similar to Figures 1 and 2 respectively, but illustrating a modified form of the invention.
Figure 4:
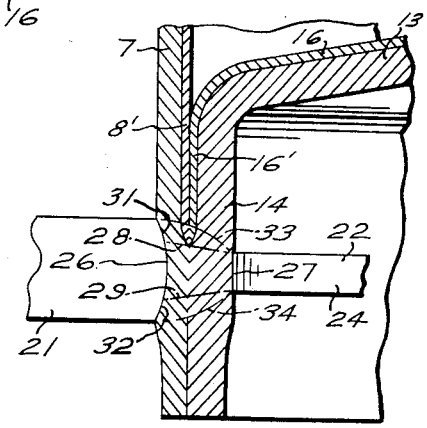

In the embodiments illustrated in Figures 1 and 2, an annular seal between the aluminum liners will be effected on both sides of the steel to steel weld. However since it is the seal at the side adjacent the interior of the tank that is essential for sealing off the interior of the inner receptacle from the steel shell, the liners 8' and 16' may as shown in Figures 3 and 4 be foreshortened so as to terminate as at 36 preferably within the pressurized area. In this way as will be evident but one seal between the liners will be effected.

Figure 5:
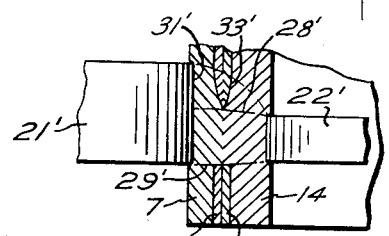
Figure 5 is a detail sectional view similar to Figure 1, but with a modified arrangement of the welding apparatus.

In the embodiment illustrated in Figure 5, both wheels 21' and 22' are provided with cylindrical peripheral faces, but the wheel 21' has a relatively large peripheral portion 31' which is laterally offset from the wheel 22'. Thus, here too, the high pressure zone is substantially confined to the thickness of wheel 22', and extends between lines 28' and 29', while the low pressurized area extends from the laterally offset portion 31' of wheel 21', as indicated by the line, it being understood that the current flow, and consequently the heat is applied in both of these zones.

What is claimed is:

1. In the art of fabricating tanks and the like with different sections each having a backing sheet of steel and a separate liner of aluminum at one side thereof, the method of joining said sections which comprises placing the sections in engagement with the steel sheets in opposing spaced relation and the liners interposed therebetween and in contact with each other, electric resistance seam welding the steel sheets together by exerting pressure against the exposed sides of the sheets sufficient to expel substantially all of the aluminum in the pressure area and to weld the sheets together in such area, and passing the welding current through portions of adjoining sections in an area adjacent said steel to steel weld area without the application of said welding pressure but with the current such that the aluminum liners in such adjacent area will be fused together.

2. In the art of fabricating tanks and the like with different sections each having a backing sheet of steel and a separate liner of aluminum at one side thereof, the method of joining said sections which comprises placing the sections in engagement with the steel sheets in opposing spaced relation and the liners interposed therebetween and in contact with each other, expelling all of the aluminum between the sheets along a selected area and forming a steel to steel weld between the sheets in place of such aluminum, said steps of expelling the aluminum and forming the steel weld being effected by electric resistance welding the sheets with pressure contact with the opposed sides thereof, and simultaneously fusing together the aluminum liner portions adjacent said weld by passing the resistance weld current through such portions and the portions of the sheet thereover but substantially without pressure contact with at least one of said sheet sections.

3. In the art of fabricating tanks and the like with different sections each having a backing sheet of steel and a separate liner at one side thereof formed of a material having a melting point lower than the steel, the method of attaching and sealing said sections which comprises placing the sections in engagement with the steel sheets in opposing spaced relation and the liners interposed therebetween and in contact with each other, electric resistance seam welding the steel sheets together by exerting pressure against the exposed sides of the sheets sufficient to expel substantially all of the liner portions in the pressure area and to weld the sheets together in such area, and passing electric current through portions of adjoining sections in an area adjacent said steel to steel weld area without the application of said pressure but with the current such that the liners in such adjacent area will be fused together.

4. In the art of fabricating tanks and the like with different sections each having a backing sheet of steel and a separate liner at one side thereof formed of a material having a lower melting point than the steel, the method of joining said sections which comprises placing the sections in engagement with the steel sheets in opposing spaced relation and the liners interposed therebetween and in contact with each other, expelling substantially all of the liner portions between the sheets along a selected area and forming a steel to steel weld between the sheets in place of such liner portions, said steps of expelling the liner portions and forming the steel weld being effected by electric resistance welding the sheets with pressure contact with the opposed sides thereof, and simultaneously fusing together the liner portions adjacent said weld by passing the resistance weld current through such portions and the portions of the sheet thereover but substantially without pressure contact with at least one of said sheet section.

References Cited in the file of this patent

UNITED STATES PATENTS

| | | |
|---|---|---|
| 1,067,883 | Fahlman | Nov. 23, 1926 |
| 1,748,138 | McBride | Feb. 25, 1930 |
| 2,026,122 | Creager | Dec. 31, 1935 |
| 2,127,269 | Robinson | Aug. 16, 1938 |
| 2,263,021 | Uecker | Nov. 18, 1941 |
| 2,444,833 | Lampert | July 6, 1948 |
| 2,481,614 | Redmond | Sept. 13, 1949 |
| 2,613,015 | Keating | Oct. 7, 1952 |

FOREIGN PATENTS

| | | |
|---|---|---|
| 220,391 | Great Britain | Aug. 18, 1924 |